United States Patent
Moulsley et al.

(10) Patent No.: US 7,174,183 B2
(45) Date of Patent: *Feb. 6, 2007

(54) RADIO COMMUNICATION SYSTEM

(75) Inventors: Timothy J. Moulsley, Caterham (GB); Bernard Hunt, Red Hill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 373 days.

This patent is subject to a terminal disclaimer.

(21) Appl. No.: 10/729,249

(22) Filed: Dec. 5, 2003

(65) Prior Publication Data

US 2004/0082357 A1    Apr. 29, 2004

Related U.S. Application Data

(63) Continuation of application No. 09/421,645, filed on Oct. 20, 1999, now Pat. No. 6,678,529.

(30) Foreign Application Priority Data

Oct. 28, 1998    (GB) .................................. 9823467.7

(51) Int. Cl.
*H04B 7/00* (2006.01)
(52) U.S. Cl. ........................ 455/522; 455/69; 455/420; 370/329; 370/343
(58) Field of Classification Search ................ 455/522, 455/69, 420, 508; 370/329, 343, 341, 348
See application file for complete search history.

(56) References Cited

U.S. PATENT DOCUMENTS

| 5,430,760 | A | | 7/1995 | Dent | 375/144 |
|---|---|---|---|---|---|
| 5,673,259 | A | * | 9/1997 | Quick, Jr. | 370/342 |
| 5,826,198 | A | | 10/1998 | Bergns et al. | 455/457 |
| 5,909,436 | A | | 6/1999 | Engstrom et al. | 370/343 |
| 5,956,623 | A | * | 9/1999 | Narusawa | 340/7.39 |
| 6,081,727 | A | | 6/2000 | Kondo | 455/522 |
| 6,122,486 | A | * | 9/2000 | Tanaka et al. | 455/68 |
| 6,161,013 | A | | 12/2000 | Anderson et al. | 455/435 |
| 6,256,301 | B1 | | 7/2001 | Tiedemann, Jr. et al. | 370/342 |
| 6,310,868 | B2 | | 10/2001 | Uebayashi et al. | 370/335 |
| 6,381,229 | B1 | * | 4/2002 | Narvinger et al. | 370/328 |
| 6,643,275 | B1 | * | 11/2003 | Gustafsson et al. | 370/328 |

FOREIGN PATENT DOCUMENTS

| GB | 2324441 A | 10/1998 |
|---|---|---|
| WO | WO9746041 | 12/1997 |

* cited by examiner

*Primary Examiner*—Danh Cong Le
(74) *Attorney, Agent, or Firm*—Aaron Waxler; Paul Im

(57) ABSTRACT

A method of operating a radio communication system uses a random access channel to enable a secondary station to transmit a message to a primary station. The secondary station transmits a preamble to the primary station. After successful receipt of the preamble the primary station transmits a control channel including power control information to instruct the secondary station to adjust the output power of its transmitter. This method ensures that the secondary station transmits at a sufficient power for the message to be received successfully by the primary station, while minimizing interference generated by the transmission.

21 Claims, 3 Drawing Sheets

RADIO COMMUNICATION SYSTEM

CROSS REFERENCE TO RELATED APPLICATIONS

This is a continuation of prior application Ser. No. 09/421,645 filed Oct. 20, 1999, now U.S. Pat. No. 6,678,529.

The present invention relates to a method of operating a radio communication system having a random access channel. The present invention further relates to such a system and to primary and secondary stations for use in such a system. While the present specification describes a system with particular reference to the emerging Universal Mobile Telecommunication System (UMTS), it is to be understood that such techniques are equally applicable to use in other mobile radio systems.

A random access channel is a normal component of a radio communication system, enabling a Mobile Station (MS) to send short messages to a Base Station (BS). Applications include signalling to the BS when the MS is turned on, sending a packet of data to the BS when the MS is not engaged in a call, and requesting the BS to allocate a resource for the MS to use.

A variety of methods have been proposed for the implementation of a random access channel. One example, for use in UMTS (in a wide band Code Division Multiple Access (CDMA) frequency division duplex mode), is shown in FIG. 2. A MS accesses an uplink channel by sending a preamble (P) 102 followed by a message packet (MSG) 104. A BS can start to process the message packet 104 when it has received the preamble 102. Once the BS has received the message 104 it sends an acknowledgement (ACK) 106 on a downlink channel to indicate to the MS that the message 104 has been received and decoded correctly. Typically the preamble 102 might last 1 ms, followed by a 0.25 ms time interval then a 10 ms message 104.

A problem with this method is the lack of any power control. Ideally the MS transmit power should be chosen so that the preamble 102 and message 104 are received by the BS at the power level required for correct decoding of the message 104. If the MS transmits at too high a power level its signal may swamp other signals received at the BS, while if it transmits at too low a power level its signal may not be received at all by the BS.

Here the MS determines the power at which to transmit by measuring the power received from the BS over the downlink channel and using this measurement to estimate the path loss in the uplink channel. However, such a method is not very reliable. Two problems are that the required received power at the BS is not constant but varies with radio channel conditions and speed of the MS and the uplink and downlink channels are not necessarily reciprocal.

If the message 104 is not received correctly by the BS, no acknowledgement 106 is transmitted. The MS determines from the lack of an acknowledgement 106 that its access attempt has failed and, after waiting for a back-off period, repeats the attempt. This scheme has the disadvantage that several retransmissions may be needed, giving rise to the possibility of significant delays.

An improved scheme is shown in FIG. 3. The MS first transmits a preamble 102 at a reduced power level. If the BS receives and decodes the preamble correctly it transmits a preamble acknowledgement (A) 204. In the example shown in FIG. 3, after the first preamble is transmitted no acknowledgement is returned in the slot 202 allocated for it (which might typically be 1 ms in length). The MS therefore transmits another preamble 102 at a higher power level. Again no acknowledgement is received in the slot 202, so the MS transmits another preamble 102 at a still higher power. This is received and decoded by the BS, which transmits an acknowledgement 204. Having received this, the MS is able to transmit the message 104.

However, this improved scheme still does not provide closed loop power control for the message 104, which means that it will require a higher Eb/No (energy per bit/noise density) than normal data transmissions. Hence the MS needs to use more transmitter power on average, generating more interference than usual, and system uplink capacity may be wasted.

An object of the present invention is to provide closed loop power control for a random access channel.

According to a first aspect of the present invention there is provided a method of operating a radio communication system having a random access channel for enabling a secondary station to transmit a message to a primary station, comprising the secondary station transmitting a preamble encoded with a signature on the random access channel to the primary station and subsequently transmitting the message, characterised by the primary station transmitting a control channel including power control information after successful reception of the preamble, in response to which the secondary station adjusts the output power of its transmitter.

According to a second aspect of the present invention there is provided a radio communication system comprising a primary station, a secondary station and a random access channel for transmission of messages from the secondary station to the primary station, the secondary station having means for transmitting a preamble encoded with a signature on the random access channel, characterised in that the primary station has means for transmitting a control channel including power control information after successful reception of the preamble, and the secondary station has means for adjusting the output power of its transmitter in response to the reception of the control channel.

According to a third aspect of the present invention there is provided a primary station for use in a radio communication system having a random access channel for the transmission of messages from a secondary station to the primary station, the primary station having means for reception of a preamble encoded with a signature on the random access channel transmitted by the secondary station and means for determining the power of a transmission received from the secondary, characterised in that means are provided for transmitting a control channel after successful reception of the preamble, the control channel including power control information for the secondary station to alter the output power of its transmitter.

According to a fourth aspect of the present invention there is provided a secondary station comprising for use in a radio communication system having a random access channel for the transmission of messages to a primary station, the secondary station having means for transmitting a preamble encoded with a signature on the random access channel, characterised in that the secondary station has means for adjusting the output power of its transmitter in response to the reception of a control channel transmitted by the primary station.

Embodiments of the present invention will now be described, by way of example, with reference to the accompanying drawings, wherein.

In the drawings the same reference numerals have been used to indicate corresponding features.

Figure 1:
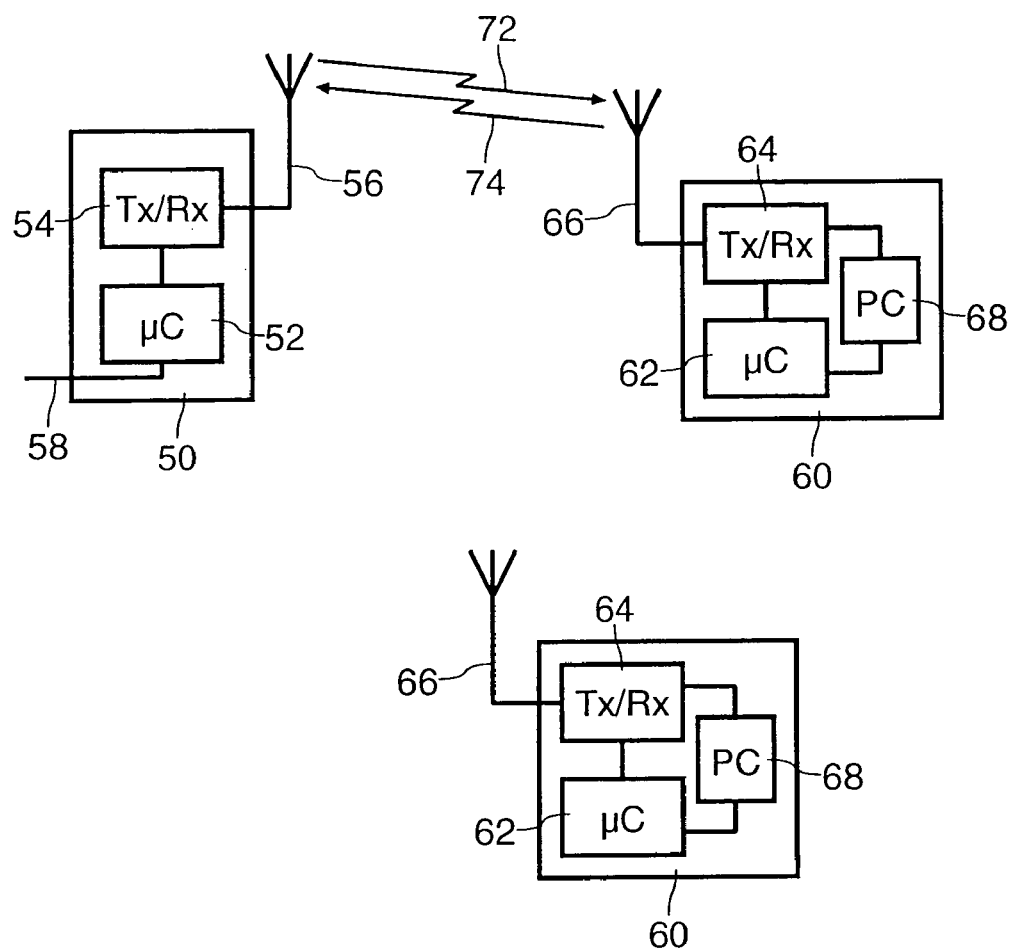
FIG. 1 is a block schematic diagram of a radio communication system in accordance with the present invention.

The system shown in FIG. 1 comprises a primary station (BS) 50 and a plurality of secondary stations (MS) 60. The BS 50 comprises a microcontroller (μC) 52, transceiver means 54 connected to radio transmission means 56, and connection means 58 for connection to the PSTN or a private network. Each MS 60 comprises a microcontroller (μC) 62, transceiver means 64 connected to radio transmission means 66, and power control means 68 for altering the transmitted power level. Communication from BS 50 to MS 60 takes place on a downlink channel 72, while communication from MS 60 to BS 50 takes place on an uplink channel 74.

The UMTS system used as an example of an application of the present invention uses a CDMA system for allocating transmission channels to base and mobile stations. On the downlink channel 72 a number of channelisation codes are used to separate transmissions intended for different users, and an additional scrambling code is applied to distinguish the transmitting BS 50. Hence, to decode a message intended for it a MS 60 has to know both the code for the BS 50 sending the data and the code for its channel.

Similarly on the uplink channel 74 a channelisation code is used to select the channel on which the MS 60 is to transmit and a scrambling code specific to the MS 60. During the preamble a MS 60 transmits a signature, which is a specific code sequence chosen at random.

Figure 2:
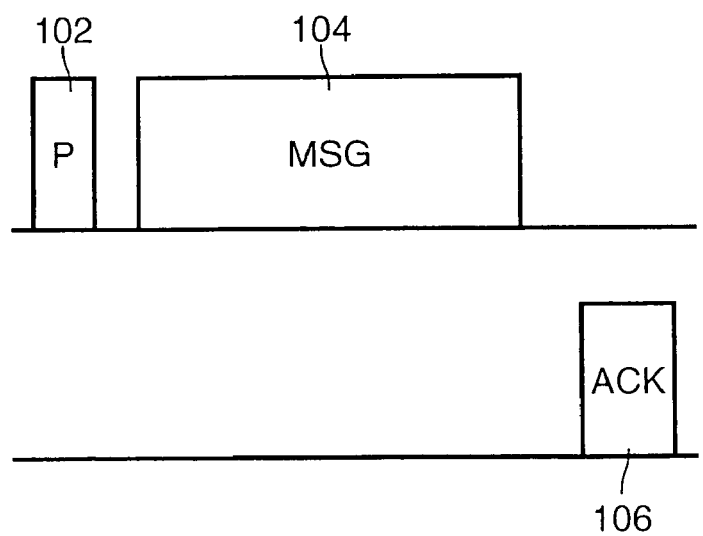
FIG. 2 illustrates a basic random access channel scheme without power control, as described above.
Figure 3:
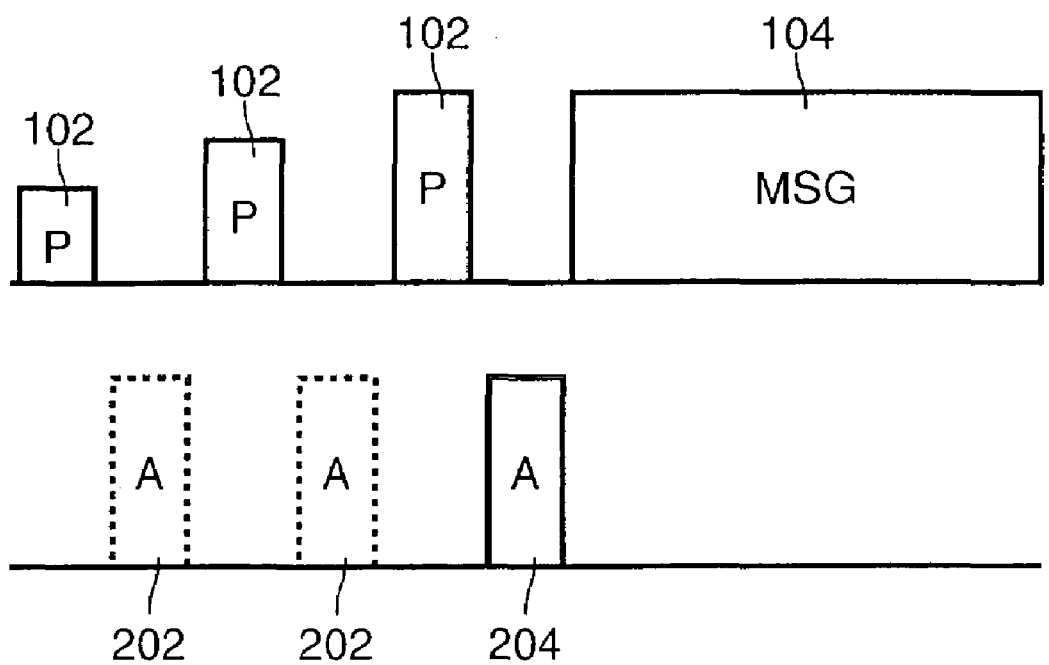
FIG. 3 illustrates a random access channel scheme having preamble power ramping and fast acknowledgement, as described above.
Figure 4:
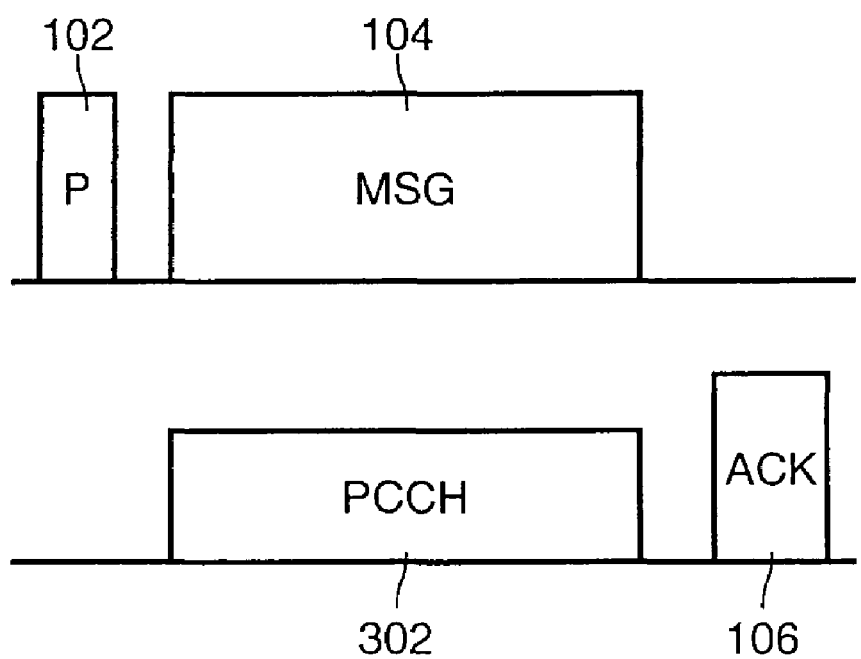
FIG. 4 illustrates a basic random access channel scheme having power control in accordance with the present invention.

A basic implementation of the present invention is illustrated in FIG. 4. A MS 60 accesses an uplink channel 74 in the same way as illustrated in FIG. 2, by sending a preamble 102 followed by a message packet 104. The message 104 could be defined to have a fixed length or, if of variable length, could include length indication information. When a BS 50 detects the preamble 102 it transmits a Physical Control CHannel (PCCH) 302 on a downlink channel 72. The PCCH includes power control information to indicate to the MS 60 whether it should raise or lower its transmission power level, and continues for the duration of the message 104.

The channelisation code used for the control channel 302 must be known to the MS 60 in advance so that the power control information can be decoded, which requires it to be pre-allocated. The code should also be specific to the preamble signature to minimise conflicts on the downlink channel 72 in response to requests from different mobiles. The pre-allocation may lead to a code shortage.

A solution to this problem is to use a different scrambling code on the control channel 302 to that used for the main downlink transmission. The use of such a secondary scrambling code by the BS 50 will have a negligible effect on system capacity since both the bit rate and duty cycle will be low.

The time interval between preamble and message should be long enough to ensure that a control channel 302 can be established at or before the start of the message 104, thereby maximising the chance of it being received without error. This time allows for BS 50 processing time and propagation delays. For example, to allow use in cells of radius up to about 38 km (much larger than the typical 2 km) the interval should be at least 250 μs.

It would also be possible to add power control information to the uplink transmission (which already has a PCCH). This would allow power control of the downlink control channel 302, although in practice this is unlikely to be necessary because the bit rate is low.

Figure 5:
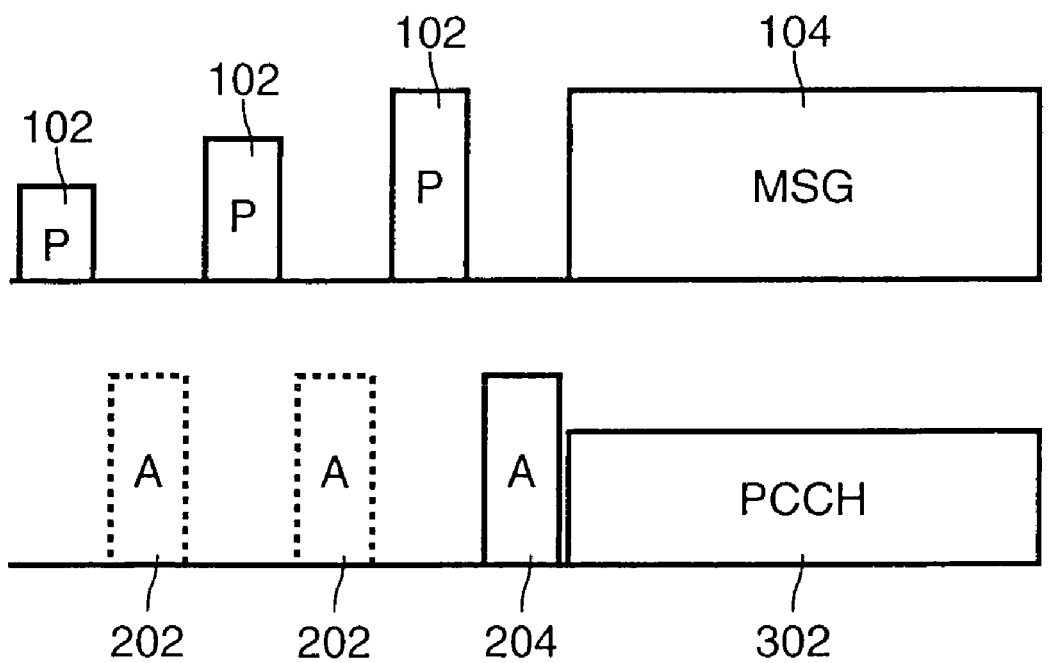
FIG. 5 illustrates a random access channel scheme with preamble power ramping having power control in accordance with the present invention.

An alternative implementation, for use in a system employing preamble power ramping, is illustrated in FIG. 5. This scheme has the advantage that the initial power level of the message 104 is approximately correct before its level can be adjusted in response to power control information in the control channel 302. As well as its primary function, of acknowledging correct receipt of the preamble 102 by the BS 50, the acknowledgement 204 can perform other functions, such as indicating that the system is busy or that access has been denied.

Figure 6:
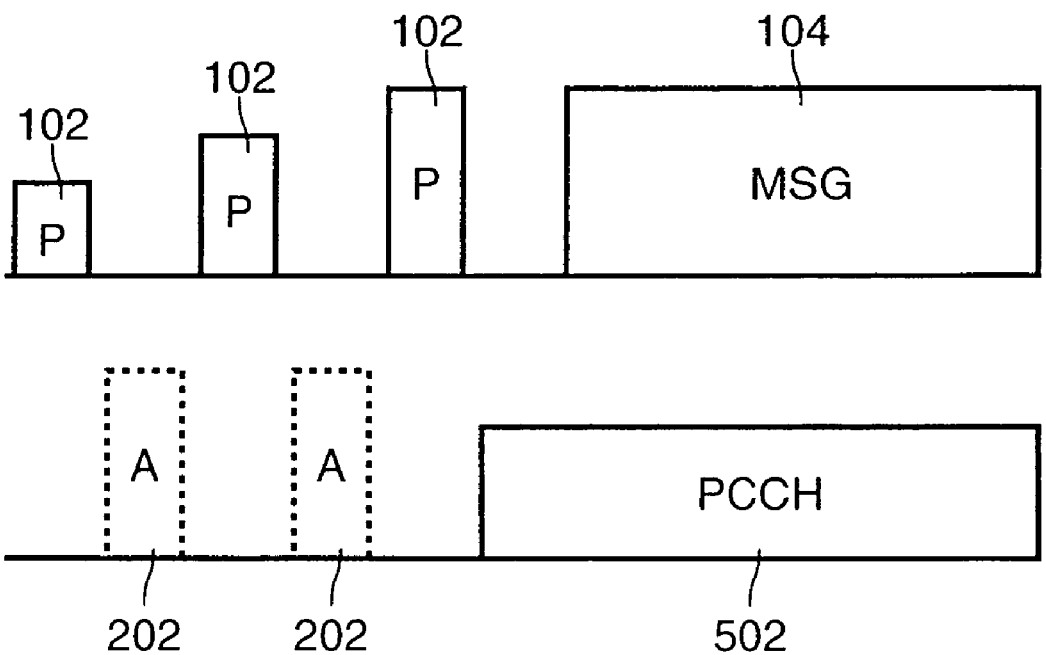
FIG. 6 illustrates a random access channel scheme with preamble power ramping having acknowledgement and power control in accordance with the present invention.

FIG. 6 illustrates a modification of this scheme in which the functions of acknowledgement and power control are combined in a single control channel 502. In such a system the start of the control channel 502 would indicate reception of the preamble 102 by the BS 50. Interruption of the control channel 502 could then be used to indicate that the uplink transmission had been corrupted, enabling the MS 60 to terminate transmission of the message 104 before attempting to send it again. Such a method for indicating corruption of the uplink transmission could also be used independently or in combination with any of the other schemes described above.

From reading the present disclosure, other modifications will be apparent to persons skilled in the art. Such modifications may involve other features which are already known in radio communication systems and component parts thereof, and which may be used instead of or in addition to features already described herein.

In the present specification and claims the word "a" or "an" preceding an element does not exclude the presence of a plurality of such elements. Further, the word "comprising" does not exclude the presence of other elements or steps than those listed.

The invention claimed is:

1. A method of operating a communication system including a secondary station for transmitting a message to a primary station, comprising:
   transmitting a preamble by said secondary station to said primary station and subsequently transmitting the message;
   transmitting by said primary station a signal including power control information after successful reception of said preamble;
   adjusting by said secondary station a level of said message in response to said power control information;
   terminating transmission of said message by said secondary station in response to detecting interruption of said signal; and
   retransmitting by said secondary station said message that had been terminated upon reception of said signal.

2. The method of claim 1, wherein said preamble includes a signature and said signal is transmitted over a control channel, said primary station being configured to select a channelization code for said control channel by reference to said signature.

3. The method of claim 2, wherein said channelization code is predetermined.

4. The method of claim 1, wherein said primary station is configured to select a scrambling code for said signal which is different to that used for some other downlink transmissions.

5. The method of claim 1, wherein said secondary station is configured to transmit a succession of said preambles at increasing power levels and at predetermined intervals until a reception of an acknowledgement from said primary station, and to transmit said message after said reception of said acknowledgement.

6. The method of claim 5, wherein transmission of said signal by said primary station constitutes said acknowledgement.

7. The method of claim 1, wherein duration of said signal is substantially identical to or greater than duration of said message.

8. A communication system comprising:
a primary station; and
a secondary station for transmitting a preamble and a massage to said primary station;
wherein said primary station is configured to transmit a signal including power control information after successful reception of said preamble, and said secondary station is configured to adjust a level of said message in response to said power control information; said secondary station being further configured to terminate transmission of said message in response to detecting interruption of said signal, and to retransmit said message that had been terminated upon reception of said signal.

9. The communication system of claim 8, wherein duration of said signal is substantially identical to or greater than duration of said message.

10. The communication system of claim 8, wherein said preamble includes a signature and said signal is transmitted over a control channel, said primary station being configured to select a channelization code for said control channel by reference to said signature.

11. The communication system of claim 8, wherein said channelization code is predetermined.

12. The communication system of claim 8, wherein said primary station is configured to select a scrambling code for said signal which is different to that used for some other downlink transmissions.

13. The communication system of claim 8, wherein said secondary station is configured to transmit a succession of said preambles at increasing power levels and at predetermined intervals until a reception of an acknowledgement from said primary station, and to transmit said message after said reception of said acknowledgement.

14. The communication system of claim 8, wherein transmission of said signal by said primary station constitutes said acknowledgement.

15. A communication system including a secondary station for transmitting a message to a primary station, said communication system comprising:
means for transmitting a preamble by said secondary station to said primary station and subsequently transmitting the message;
means for transmitting by said primary station a signal including power control information after successful reception of said preamble;
means for adjusting by said secondary station a level of said message in response to said power control information;
means for terminating transmission of said message by said secondary station in response to detecting interruption of said signal; and
means for retransmitting by said secondary station said message that had been terminated upon reception of said signal.

16. The communication system of claim 15, wherein duration of said signal is substantially identical to or greater than duration of said message.

17. The communication system of claim 15, wherein said preamble includes a signature and said signal is transmitted over a control channel, said primary station being configured to select a channelization code for said control channel by reference to said signature.

18. The communication system of claim 15, wherein said channelization code is predetermined.

19. The communication system of claim 15, wherein said primary station is configured to select a scrambling code for said signal which is different to that used for some other downlink transmissions.

20. The communication system of claim 15, wherein said secondary station is configured to transmit a succession of said preambles at increasing power levels and at predetermined intervals until a reception of an acknowledgement from said primary station, and to transmit said message after said reception of said acknowledgement.

21. The communication system of claim 15, wherein transmission of said signal by said primary station constitutes said acknowledgement.

* * * * *